(12) United States Patent
Fujiki

(10) Patent No.: US 11,660,784 B2
(45) Date of Patent: May 30, 2023

(54) MANUFACTURING APPARATUS AND METHOD OF MANUFACTURING A TOW PREPREG

(71) Applicant: HONDA MOTOR CO., LTD., Tokyo (JP)

(72) Inventor: Koei Fujiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/173,662

(22) Filed: Feb. 11, 2021

(65) Prior Publication Data

US 2021/0252744 A1 Aug. 19, 2021

(30) Foreign Application Priority Data

Feb. 17, 2020 (JP) .............................. JP2020-024068

(51) Int. Cl.
| | | |
|---|---|---|
| *B29B 15/12* | (2006.01) | |
| *B05C 5/02* | (2006.01) | |
| *B05C 11/10* | (2006.01) | |
| *G05D 7/06* | (2006.01) | |
| *G05D 5/02* | (2006.01) | |
| *B05B 12/12* | (2006.01) | |

(52) U.S. Cl.
CPC ............ *B29B 15/122* (2013.01); *B05B 12/12* (2013.01); *B05C 5/0245* (2013.01); *B05C 11/1015* (2013.01); *G05D 5/02* (2013.01); *G05D 7/0623* (2013.01); *B29K 2995/0097* (2013.01)

(58) Field of Classification Search
USPC .................. 118/256, 258, 261, 244, 663, 712
See application file for complete search history.

(56) References Cited

U.S. PATENT DOCUMENTS

| | | | |
|---|---|---|---|
| 2016/0299085 A1* | 10/2016 | Fisset ..................... | G01N 23/16 |
| 2017/0106405 A1 | 4/2017 | Iwata et al. | |
| 2019/0337011 A1* | 11/2019 | Iwata ..................... | B29B 15/122 |

FOREIGN PATENT DOCUMENTS

| | | | | |
|---|---|---|---|---|
| JP | 2004-209923 A | | 7/2004 | |
| JP | 2017-074699 A | | 4/2017 | |
| WO | WO-2020161516 A1 * | | 8/2020 | ........... B29B 15/122 |

OTHER PUBLICATIONS

Office Action including search report dated Aug. 9, 2022 issued over the corresponding Chinese Patent Application No. 202110185271.9 with the English translation thereof.

(Continued)

*Primary Examiner* — Yewebdar T Tadesse
(74) *Attorney, Agent, or Firm* — Carrier Shende & Associates, P.C.; Joseph P. Carrier; Fulchand P. Shende

(57) ABSTRACT

A resin supply unit of a manufacturing apparatus supplies a resin to a roller surface of an impregnated roller which is capable of rotating at a constant speed. A transport mechanism brings the fiber bundle into contact with the resin on the roller surface and thereby forms a tow prepreg while the fiber bundle is being transported. A fineness acquisition unit acquires as a fineness acquisition value a fineness, which is defined by a mass per unit length of the fiber bundle during conveyance thereof before being brought into contact with the resin. A resin supply amount control unit controls the resin supply amount based on the fineness acquisition value, in a manner so that a resin content of the tow prepreg becomes a target resin content.

7 Claims, 3 Drawing Sheets

(56) References Cited

OTHER PUBLICATIONS

Office Action including search report dated Jan. 18, 2023 issued over the corresponding Chinese Patent Application No. 202110185271.9 with the machine English translation of detailed action in the Office Action.

Edited by Wei Xia, p. 79, "Industrial Textiles Design and Production", Shanghai: Donghua University Press Date of Publication: Aug. 31, 2009.

\* cited by examiner

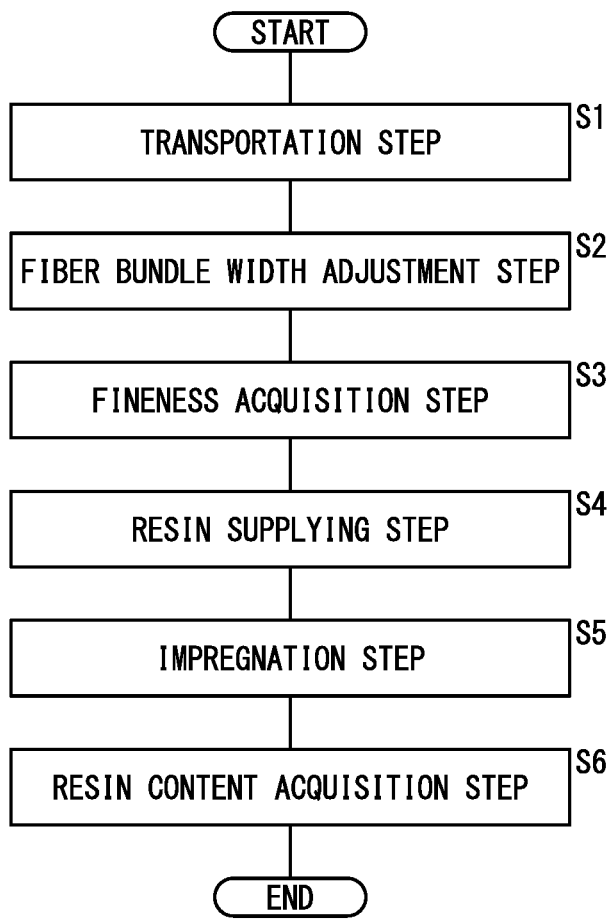

MANUFACTURING APPARATUS AND METHOD OF MANUFACTURING A TOW PREPREG

CROSS-REFERENCE TO RELATED APPLICATION

This application is based upon and claims the benefit of priority from Japanese Patent Application No. 2020-024068 filed on Feb. 17, 2020, the contents of which are incorporated herein by reference.

BACKGROUND OF THE INVENTION

Field of the Invention

The present invention relates to a manufacturing apparatus and a method of manufacturing a tow prepreg for manufacturing a tow prepreg by impregnating with a resin a fiber bundle in which a plurality of fibers are bundled together.

Description of the Related Art

When manufacturing a tow prepreg by impregnating with a resin a fiber bundle in which a plurality of fibers are bundled together, it is possible to obtain a tow prepreg of stable quality by setting the resin content, which is defined by a ratio of a mass of the resin with respect to a mass of the entirety (the fibers and the resin) of the tow prepreg, to a target value. Thus, in order to set the resin content of the tow prepreg to such a target value, for example, the apparatus for manufacturing a tow prepreg as disclosed in Japanese Laid-Open Patent Publication No. 2017-074699 has been proposed.

Such a manufacturing apparatus is equipped with a resin tank in which a resin is stored, a resin reservoir to which the resin is supplied from the resin tank, and an impregnated roller to which an amount of the resin is supplied in accordance with a number of rotations by the roller being rotated while passing through the interior of the resin reservoir. The manufacturing apparatus, after having formed the tow prepreg by bringing the resin on the impregnated roller into contact with the fiber bundle, then winds the tow prepreg onto a bobbin. The speed of rotation of the impregnated roller is feedback-controlled, based on an acquired value obtained by calculating the resin content of the tow prepreg that is wound around the bobbin, and a target value of the resin content. Stated otherwise, the amount of the resin contained in the fiber bundle is controlled by the impregnated roller, in a manner so that the acquired value of the resin content of the tow prepreg converges toward the target value.

In such a feedback control, the respective masses of the fibers and the resin of the tow prepreg that is wound around the bobbin are obtained in the following manner, and the acquired value of the resin content is calculated using the aforementioned masses. More specifically, a fineness (mass per unit length) of the fiber bundle is obtained in advance by dividing the mass of the entire fiber bundle prior to containing the resin by the overall length of the fiber bundle. A multiplied value, which is calculated by multiplying the fineness by the wound length of the tow prepreg that is wound on the bobbin as measured using a length measuring roller, is used for the mass of the fibers. On the other hand, a subtracted value, which is calculated by subtracting the mass of the resin that has dripped down from the impregnated roller from the mass of the resin supplied from the resin tank to the resin reservoir, is used for the mass of the resin of the tow prepreg that is wound on the bobbin.

SUMMARY OF THE INVENTION

In the above-described control device, a feedback control is performed on the premise that the total length of the fiber bundle is of a uniform fineness. However, in actuality, the fiber bundle may vary in fineness in the lengthwise direction. Therefore, for example, a concern arises in that the actual value of the resin content of the tow prepreg that is wound on the bobbin tends to differ from the aforementioned acquired value. Even if such an acquired value is made to converge toward the target value, it is difficult for the actual resin content of the tow prepreg to be set to the target value.

The present invention has the object of providing a manufacturing apparatus and a method of manufacturing a tow prepreg, which are capable of controlling with high accuracy a resin content of the tow prepreg, regardless of variations in the fineness of the fiber bundle.

One aspect of the present invention is characterized by a tow prepreg manufacturing apparatus configured to manufacture a tow prepreg by impregnating with a resin a fiber bundle in which a plurality of fibers are bundled together, including an impregnated roller capable of rotating at a constant speed, a resin supply unit configured to supply the resin to a roller surface of the impregnated roller, a transport mechanism configured to bring the fiber bundle into contact with the resin on the roller surface and thereby form the tow prepreg while the fiber bundle is being transported, a fineness acquisition unit configured to acquire as a fineness acquisition value a fineness, which is defined by a mass per unit length of the fiber bundle prior to being brought into contact with the resin during conveyance thereof by the transport mechanism, and a resin supply amount control unit configured to control a resin supply amount of the resin supplied to the roller surface by the resin supply unit, wherein the resin supply amount control unit controls the resin supply amount based on the fineness acquisition value, in a manner so that a resin content of the tow prepreg becomes a target resin content.

Another aspect of the present invention is characterized by a method of manufacturing a tow prepreg for manufacturing a tow prepreg by impregnating with a resin a fiber bundle in which a plurality of fibers are bundled together, including a transportation step of transporting the fiber bundle by a transport mechanism, a fineness acquisition step of acquiring as a fineness acquisition value a fineness, which is defined by a mass per unit length of the fiber bundle prior to being impregnated with the resin during conveyance thereof by the transport mechanism, a resin supplying step of supplying the resin to a roller surface of an impregnated roller configured to rotate at a constant speed, and an impregnation step of bringing the fiber bundle during conveyance thereof into contact with the resin on the roller surface to thereby form the tow prepreg, wherein, in the resin supplying step, a resin supply amount of the resin to the roller surface is controlled based on the fineness acquisition value, in a manner so that a resin content of the tow prepreg becomes a target resin content.

According to the present invention, the fineness of the fiber bundle is acquired as a fineness acquisition value, prior to the fiber bundle during conveyance thereof due to the transport mechanism coming into contact with the resin on the roller surface. Additionally, based on the fineness acquisition value, the amount of resin supplied to the roller surface is controlled, in a manner so that the resin content of the tow prepreg becomes a target resin content.

Consequently, the fiber bundle can be made to contain (be impregnated with) the resin in a manner so that the resin content of the tow prepreg becomes the target resin content, in accordance with the fineness acquisition value corresponding to the actual fineness of the fiber bundle prior to the resin being supplied thereto. Therefore, the resin content of the tow prepreg can be controlled with high accuracy, regardless of variations in the fineness of the fiber bundle.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a flowchart for describing a method of manufacturing the tow prepreg according to the embodiment of the present invention.

DETAILED DESCRIPTION OF THE PREFERRED EMBODIMENTS

Preferred embodiments in relation to a manufacturing apparatus and a method of manufacturing a tow prepreg according to the present invention will be presented and described in detail below with reference to the accompanying drawings.

Figure 1:
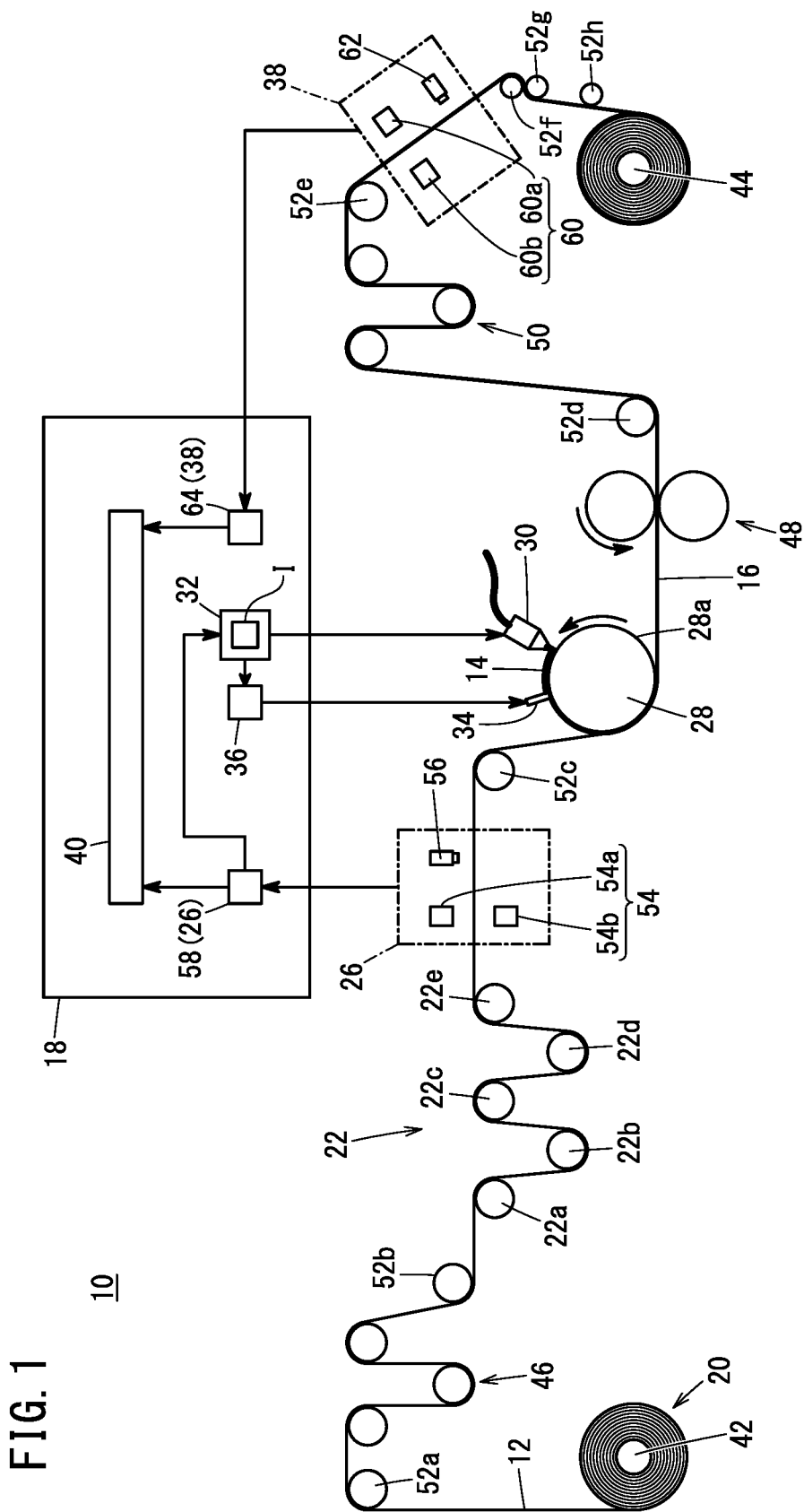
FIG. 1 is a schematic overall diagram of a tow prepreg manufacturing apparatus according to an embodiment of the present invention.

As shown in FIG. 1 and described below, a tow prepreg manufacturing apparatus (hereinafter, also simply referred to as a manufacturing apparatus) 10 according to the present embodiment manufactures a tow prepreg 16 by impregnating with a resin 14 a fiber bundle 12 in which a plurality of fibers are bundled together. Although not shown, the manufactured tow prepreg 16 can be used to form a fiber-reinforced resin layer, by being wound around an outer surface of a liner made of resin that constitutes a high pressure tank. However, the manner in which the tow prepreg 16 is used is not particularly limited.

As examples of the fibers that constitute the fiber bundle 12, there may be cited carbon fibers, glass fibers, aramid fibers, and the like. As examples of the resin 14 that is impregnated (contained within) the fiber bundle 12, there may be cited epoxy resin, phenol resin, unsaturated polyester resin, and the like.

The manufacturing apparatus 10 includes a control unit 18, a transport mechanism 20, a fiber bundle width adjustment unit 22, a fineness acquisition unit 26, an impregnated roller 28, a resin supply unit 30, a resin supply amount control unit 32, a blade 34, a blade adjustment unit 36, a tow prepreg acquisition unit 38, and a resin content acquisition unit 40.

The control unit 18 is configured in the form of a computer provided with a CPU, memories, and the like (none of which are shown). The CPU executes predetermined computations in accordance with a control program, and performs various processes and controls in relation to the manufacturing apparatus 10. More specifically, the control unit 18 receives detection signals from various measurement units (sensors) provided in the manufacturing apparatus 10, and outputs drive signals to the respective units. The functions of the control unit 18 may be realized not only by software, but also by hardware on the basis of a circuit configuration provided in the control unit 18.

The transport mechanism 20 serves as a transport path extending from an unwinding roller 42 that winds out the fiber bundle 12, which is an object to be impregnated with the resin 14, to a take-up roller 44 on which the tow prepreg 16, which is formed by impregnating the fiber bundle 12 with the resin 14, is wound, and the transport mechanism 20 transports the fiber bundle 12 and the tow prepreg 16. In addition to the aforementioned unwinding roller 42 and the take-up roller 44, the transport mechanism 20 includes, for example, a first tension adjustment unit 46, feeding rolls 48, a second tension adjustment unit 50, and a plurality of guide rollers 52a, 52b, 52c, 52d, 52e, 52f, 52g, and 52h.

The first tension adjustment unit 46 is made up, for example, from a dancer roll or the like, and adjusts the tension of the fiber bundle 12 that is wound out from the unwinding roller 42. The feeding rolls 48 are made up, for example, from nip rolls or the like, and deliver the tow prepreg 16 to a subsequent stage of the transport path. The second tension adjustment unit 50 is made up, for example, from a dancer roll or the like, and adjusts the tension of the tow prepreg 16 that is delivered from the feeding rolls 48. The plurality of guide rollers 52a to 52h are arranged respectively at required positions of the transport path, and guide the fiber bundle 12 or the tow prepreg 16 so as to be transported in a desired direction.

Moreover, the transport speeds of the fiber bundle 12 and the tow prepreg 16 can be controlled by the control unit 18 in accordance with the speed of rotation of the unwinding roller 42, the take-up roller 44, the feeding rolls 48, and the like. Further, adjustment of the tension of the fiber bundle 12 and the tow prepreg 16 by the first tension adjustment unit 46 and the second tension adjustment unit 50 can be controlled by the control unit 18.

According to the present embodiment, the unwinding roller 42, the guide roller 52a, the first tension adjustment unit 46, the guide roller 52b, the fiber bundle width adjustment unit 22, the fineness acquisition unit 26, the guide roller 52c, the impregnated roller 28, the feeding rolls 48, the guide roller 52d, the second tension adjustment unit 50, the guide roller 52e, the tow prepreg acquisition unit 38, the guide rollers 52f to 52h, and the take-up roller 44 are arranged in this order from an upstream side toward a downstream side of the transport path.

The fiber bundle width adjustment unit 22 includes, for example, a plurality of width adjusting rollers 22a, 22b, 22c, 22d, and 22e, which adjust the width of the fiber bundle 12 by the circumferential surfaces of the width adjusting rollers 22a to 22e being placed in abutment with the fiber bundle 12 prior to reaching the fineness acquisition unit 26. In accordance with this feature, the fiber bundle 12 can be adjusted in a manner so as to be formed with a predetermined width. Moreover, the fiber bundle 12 after having passed through the fiber bundle width adjustment unit 22 is constituted from a plurality of fibers arranged in strip shapes with the conveyance direction thereof (the direction of the arrow X) being in the longitudinal direction as shown in FIG. 2, and the width (W) thereof being formed to be greater than the thickness of the fiber bundle 12.

The fineness acquisition unit 26 acquires as a fineness acquisition value a fineness, which is defined by a mass per unit length (g/m) of the fiber bundle 12 during conveyance thereof by the transport mechanism 20 shown in FIG. 1, and prior to being brought into contact with the resin 14. As the unit of fineness, there may be used the unit of textile measurement known as TEX, which is defined by a mass per 1000 m (g/1000 m) of the fiber bundle 12. The fineness acquisition unit 26 acquires the fineness acquisition value at a predetermined cycle. Therefore, in the lengthwise direction (conveyance direction) of the fiber bundle 12, the fineness is acquired at each of predetermined distances in accordance with the transport speed of the fiber bundle 12.

Figure 2:
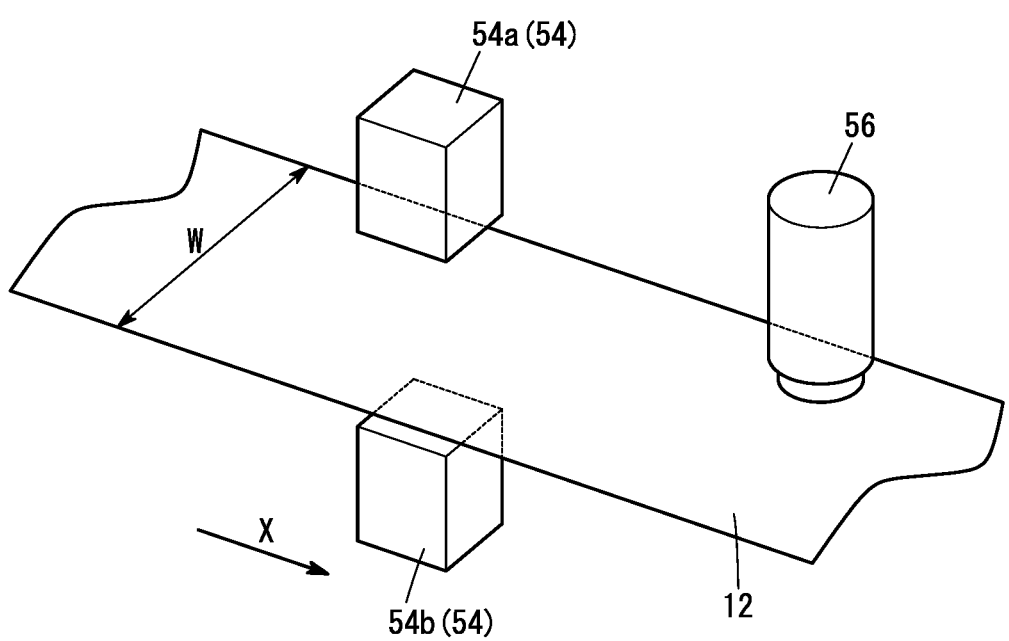
FIG. 2 is a schematic perspective explanatory diagram for describing a fineness acquisition unit of the manufacturing apparatus shown in FIG. 1.

Further, as shown in FIGS. 1 and 2, the fineness acquisition unit 26 includes a fiber bundle basis weight measurement unit 54 that measures the mass per unit area (g/m$^2$, also referred to as a basis weight or grams per square meter) of the fiber bundle 12 and thereby obtains a fiber bundle basis weight measurement value, a fiber bundle width measurement unit 56 that measures the width (m) of the fiber bundle 12 and thereby obtains a fiber bundle width measurement value, and a fineness calculation unit 58 provided in the control unit 18. The fineness acquisition unit 26 is capable of acquiring the fineness acquisition value, by multiplying in the fineness calculation unit 58 the fiber bundle basis weight measurement value obtained by the fiber bundle basis weight measurement unit 54, and the fiber bundle width measurement value obtained by the fiber bundle width measurement unit 56.

The fiber bundle basis weight measurement unit 54 includes, for example, an X-ray irradiation unit 54a that irradiates X-rays in a thickness direction of the fiber bundle 12, and an X-ray detection unit 54b that detects the X-rays that have passed through the fiber bundle 12, and is capable of determining a fiber bundle basis weight measurement value based on an amount of X-ray transmission attenuation of the fiber bundle 12. The fiber bundle width measurement unit 56 is made up, for example, from an image measuring camera or the like, and is capable of determining a fiber bundle width measurement value of the fiber bundle 12 by way of image measurement based on a captured image of the fiber bundle 12.

As shown in FIG. 1, the impregnated roller 28 is capable of being rotated at a constant speed, for example, under the control of the control unit 18. In the vicinity of the impregnated roller 28, there are disposed a resin supply unit 30 that supplies the resin 14 to a roller surface 28a, which is a circumferential surface of the impregnated roller 28, and a blade 34 that faces toward the roller surface 28a at a predetermined distance. A resin supply amount, which is an amount of the resin 14 that the resin supply unit 30 supplies to the roller surface 28a, is controlled by the resin supply amount control unit 32 provided in the control unit 18. When the fiber bundle 12 during conveyance thereof by the transport mechanism 20 comes into contact with the resin 14 on the roller surface 28a, the resin 14 is impregnated into the fiber bundle 12 to thereby form the tow prepreg 16.

The resin supply amount control unit 32 controls the resin supply amount based on the fineness acquisition value, in a manner so that the resin content of the tow prepreg 16 becomes a target resin content. More specifically, the resin supply amount control unit 32 includes resin supply amount setting information I that defines a relationship between the fineness that results in the target resin content and the resin supply amount. The resin supply amount is controlled so as to bring about the target resin supply amount determined from the resin supply amount setting information I and the fineness acquisition value. In this instance, the resin content of the tow prepreg 16 is a ratio of the mass of the fibers contained in the tow prepreg 16 with respect to the total mass of the tow prepreg 16 (the total mass of the fibers and the resin 14 contained within the tow prepreg 16).

As described above, in the case that the tow prepreg 16 is used to form a fiber reinforced resin layer of a high pressure tank, the target resin content of the tow prepreg 16 can be determined in the following manner. More specifically, when the resin content of the tow prepreg 16 is lower than a predetermined allowable lower limit value, voids are likely to be formed inside the fiber reinforced resin layer, due to the fact that the amount of the resin 14 contained within the tow prepreg 16 is small. As the proportion of such voids formed in the fiber reinforced resin layer increases, the strength of the high pressure tank decreases, and therefore, the pressure of the fluid that can be accommodated inside the high pressure tank also decreases.

On the other hand, if the resin content of the tow prepreg 16 becomes higher than the predetermined allowable upper limit value, then when the resin liner is coated or covered with the tow prepreg 16, the proportion of the area where the fiber bundle 12 is in contact with the resin liner decreases at an amount per unit length of the tow prepreg 16. In this case, a concern arises in that the function of the fiber-reinforced resin layer to suppress expansion of the resin liner when the pressure inside the high pressure tank rises decreases. If the amount of the tow prepreg 16 (number of turns of the tow prepreg 16 on the resin liner) used to form the fiber reinforced resin layer is increased in order to avoid such a decrease in functionality, a concern arises in that the weight of the high pressure tank increases and the cost thereof also increases.

Thus, the target resin content of the tow prepreg 16 is preferably determined to be an appropriate value between an allowable lower limit value and an allowable upper limit value, in a manner so as to be capable of achieving high strength while suppressing an increase in the weight of the high pressure tank.

The resin content of the tow prepreg 16 is calculated using the mass of the fibers, and more specifically the mass of the fiber bundle 12 contained within the tow prepreg 16. The fineness, which is defined by the mass per unit length of the fiber bundle 12, generally varies depending on the position of the fiber bundle 12 in the lengthwise direction. When the fineness changes, the mass of the resin 14 required in order to set the resin content of the tow prepreg 16 to the target resin content also changes. Thus, the resin supply amount setting information I can be obtained by determining the target resin supply amount supplied to the roller surface 28a for each of respective finenesses of the fiber bundle 12, in a manner so that the resin content of the tow prepreg 16 becomes the target resin content. The fineness and the resin supply amount in the resin supply amount setting information I have a relationship such that, for example, as the fineness increases, the resin supply amount also increases.

The resin supply amount control unit 32, using the resin supply amount setting information I and the fineness acquisition value acquired by the fineness acquisition unit 26, controls the resin supply amount supplied to the roller surface 28a, so as to become a target resin supply amount corresponding to the fineness acquisition value. Consequently, it is possible to impregnate the fiber bundle 12 with the resin 14, in a manner so that the resin content of the tow prepreg 16 becomes the target resin content in accordance with the fineness of the actual fiber bundle 12.

In the transport path of the fiber bundle 12, there is provided a resin contact position where the resin 14 on the roller surface 28a and the fiber bundle 12 come into contact with each other, at a stage after the fineness acquisition position where the fineness acquisition unit 26 acquires the fineness acquisition value. When the fineness acquisition location of the fiber bundle 12 at which the fineness acquisition value is acquired at the fineness acquisition position has reached the resin contact position, the resin supply amount control unit 32 controls the resin supply amount of the resin 14 that comes into contact with the fineness acquisition location, in a manner so that the resin supply amount of the resin 14 in contact with the fineness acquisition location becomes the target resin supply amount corresponding to the fineness acquisition value at the fineness acquisition location.

Such a control can be carried out, for example, based on the distance between the fineness measurement position of the transport path and the resin contact position, and the transport speed of the fiber bundle 12 by the transport mechanism 20. By controlling the resin supply amount in this manner, the resin content of the tow prepreg 16 is adjusted in a manner so as to become the target resin content corresponding to the actual fineness of the location where the resin 14 of the fiber bundle 12 is applied.

The blade 34, by contacting the resin 14 after having been supplied onto the roller surface 28a and prior to contacting the fiber bundle 12, levels the thickness of the resin 14. The blade adjustment unit 36 provided in the control unit 18, by way of a non-illustrated driving mechanism, adjusts the distance between the blade 34 and the roller surface 28a in accordance with the resin supply amount supplied by the resin supply unit 30. More specifically, in the blade adjustment unit 36, the amount of the resin 14 that passes between the blade 34 and the roller surface 28a is adjusted so as to become a set resin supply amount which corresponds to the fineness acquisition value of the fiber bundle 12 that is in contact with the resin 14, and further, the distance between the blade 34 and the roller surface 28a is adjusted so as to level the thickness of the resin 14 on the roller surface 28a. Consequently, it is possible for the resin 14 to be satisfactorily impregnated with a target amount of the resin 14 over the entire widthwise direction of the fiber bundle 12 that is in contact with the resin 14 on the roller surface 28a.

The tow prepreg acquisition unit 38 acquires the tow prepreg acquisition value, which is defined by the mass per unit length (g/m) of the tow prepreg 16 prior to the tow prepreg 16 that is formed by passing the fiber bundle 12 over the impregnated roller 28 being wound up on the take-up roller 44. The tow prepreg acquisition unit 38 can be configured in substantially the same manner as the fineness acquisition unit 26.

More specifically, the tow prepreg acquisition unit 38 includes a tow prepreg basis weight measurement unit 60 that measures the mass per unit area (g/m$^2$) of the tow prepreg 16 and thereby obtains a tow prepreg basis weight measurement value, a tow prepreg width measurement unit 62 that measures the width (m) of the tow prepreg 16 and thereby obtains a tow prepreg width measurement value, and a tow prepreg calculation unit 64 provided in the control unit 18. The tow prepreg acquisition unit 38 is capable of acquiring the tow prepreg acquisition value, by multiplying in the tow prepreg calculation unit 64 the tow prepreg basis weight measurement value obtained by the tow prepreg basis weight measurement unit 60, and the tow prepreg width measurement value obtained by the tow prepreg width measurement unit 62.

The tow prepreg basis weight measurement unit 60 includes, for example, an X-ray irradiation unit 60a that irradiates X-rays in a thickness direction of the tow prepreg 16, and an X-ray detection unit 60b that detects the X-rays that have passed through the tow prepreg 16, and is capable of determining a tow prepreg basis weight measurement value based on an amount of X-ray transmission attenuation of the tow prepreg 16. The tow prepreg width measurement unit 62 is made up, for example, from an image measuring camera or the like, and is capable of determining a tow prepreg width measurement value of the tow prepreg 16 by way of image measurement based on a captured image of the tow prepreg 16.

The resin content acquisition unit 40 acquires a resin content acquisition value of the tow prepreg 16, based on the fineness acquisition value acquired by the fineness acquisition unit 26, and the tow prepreg acquisition value acquired by the tow prepreg acquisition unit 38. More specifically, the resin content acquisition value can be obtained by determining a subtraction value calculated by subtracting the fineness acquisition value from the tow prepreg acquisition value, and determining a ratio of the subtraction value with respect to the tow prepreg acquisition value.

In the resin content acquisition unit 40, the resin content acquisition value is obtained using the fineness acquisition value and the tow prepreg acquisition value. Preferably, the tow prepreg acquisition value is acquired when a portion of the tow prepreg 16 has reached the tow prepreg acquisition unit 38, the portion being formed of the fiber bundle 12 containing the resin 14 at the fineness acquisition location of the fiber bundle 12 where the fineness acquisition value was acquired. Consequently, it becomes possible to obtain the resin content acquisition value with high accuracy in accordance with the actual fineness of the fiber bundle 12, regardless of variations in the fineness of the fiber bundle 12.

The manufacturing apparatus 10 according to the present embodiment is basically configured as described above. A method of manufacturing a tow prepreg according to the present embodiment will be described below with reference to FIGS. 1 to 3, which exemplify a case in which the tow prepreg 16 is manufactured using the manufacturing apparatus 10.

In such a method of manufacturing, a transportation step (step S1 of FIG. 3) is performed in which the transport mechanism 20 is driven, and transports the fiber bundle 12 that is wound out from the unwinding roller 42 toward the take-up roller 44 at a predetermined transport speed. The fiber bundle 12, which is wound out from the unwinding roller 42, is guided onto the first tension adjustment unit 46 via the guide roller 52a, and after the tension in the conveyance direction thereof is adjusted, the fiber bundle 12 is introduced to the fiber bundle width adjustment unit 22 via the guide roller 52b. In the fiber bundle width adjustment unit 22, a fiber bundle width adjustment step (step S2 in FIG. 3) is performed to adjust the width of the fiber bundle 12. The fiber bundle 12, the width of which has been adjusted in the fiber bundle width adjustment step, is introduced to the fineness acquisition unit 26.

In the fineness acquisition unit 26, a fineness acquisition step (step S3 of FIG. 3) is performed in order to acquire the fineness acquisition value in relation to the fiber bundle 12 during conveyance thereof by the transport mechanism 20 and prior to being impregnated with the resin 14. In the fineness acquisition step of the present embodiment, for example, a location formed with a predetermined length (for example, 500 mm) in the conveyance direction of the fiber bundle 12 is defined as a fineness acquisition location. Concerning the fineness acquisition location, the fineness acquisition unit 26 obtains the fineness acquisition values at a predetermined number of locations (for example, ten locations) where the fineness acquisition values are acquired in accordance with the cycles and the transport speed of the fiber bundle 12, and an average value of the fineness acquisition values is calculated. The average value is taken as the fineness acquisition value of the fineness acquisition location.

Next, a resin supplying step (step S4 of FIG. 3) is performed in which the resin 14 is supplied by the resin supply unit 30 to the roller surface 28a of the impregnated roller 28 which is rotated at a constant speed. In the resin supplying step, the resin supply amount is controlled so as to become the target resin supply amount determined from the resin supply amount setting information I and the fineness acquisition value. According to the present embodiment, when the fineness acquisition location of the fiber bundle 12 has reached the resin contact position where it comes into contact with the resin 14 on the roller surface 28a, the resin supply amount of the resin 14 that comes into contact with the fineness acquisition location is controlled in a manner so that the resin supply amount of the resin 14 becomes the target resin supply amount corresponding to the fineness acquisition value at the fineness acquisition location.

Further, in the resin supplying step, the distance between the blade 34 and the roller surface 28a is adjusted by the blade adjustment unit 36, in accordance with the amount of resin supplied onto the roller surface 28a. Due to rotation of the impregnated roller 28, when the blade 34 comes into contact with the resin 14 on the roller surface 28a, the thickness of the resin 14 on the roller surface 28a is leveled.

Next, an impregnation step (step S5 of FIG. 3) is performed in which the fiber bundle 12 is brought into contact with the resin 14 on the roller surface 28a to thereby form the tow prepreg 16. More specifically, the fiber bundle 12 after having passed through the fineness acquisition unit 26 is placed in contact with the resin 14 on the roller surface 28a, by adjusting the conveyance direction thereof via the guide roller 52c. Consequently, the tow prepreg 16 is formed such that it contains the resin 14 having a mass set in a manner so that the target resin content is brought about in accordance with the fineness acquisition value at the fineness acquisition location.

The tow prepreg 16 is transported by the feeding rolls 48 to a subsequent stage of the transport path. The tow prepreg 16 after having passed through the feeding rolls 48 is guided onto the second tension adjustment unit 50 via the guide roller 52d, and after the tension in the conveyance direction thereof is adjusted, the tow prepreg 16 is introduced to the tow prepreg acquisition unit 38 via the guide roller 52e.

The tow prepreg acquisition unit 38 acquires the tow prepreg acquisition value of the tow prepreg 16 during conveyance thereof. According to the present embodiment, the tow prepreg acquisition value is acquired when the fineness acquisition location, which is where the fineness acquisition value is acquired, has reached the tow prepreg acquisition unit 38. Based on the tow prepreg acquisition value and the fineness acquisition value at the fineness acquisition location, a resin content acquisition step (step S6 of FIG. 3) is performed to acquire the resin content acquisition value of the tow prepreg 16 by the resin content acquisition unit 40.

After the resin content has been acquired, the tow prepreg 16 is wound around the take-up roller 44 via the guide rollers 52f to 52h. Consequently, the tow prepreg 16 which is manufactured by the manufacturing apparatus 10 is obtained in a state of being wound around the take-up roller 44.

As can be appreciated from the above, in the manufacturing apparatus 10 and the method of manufacturing the tow prepreg 16 according to the present embodiment, the fineness of the fiber bundle 12 is acquired as the fineness acquisition value, prior to the fiber bundle 12 during conveyance thereof coming into contact with the resin 14 on the roller surface 28a due to the transport mechanism 20. Additionally, based on the fineness acquisition value, the amount of resin supplied to the roller surface 28a is controlled, in a manner so that the resin content becomes the target resin content.

Consequently, the fiber bundle 12 can be made to contain the resin 14 in a manner so that the resin content of the tow prepreg 16 becomes the target resin content, in accordance with the fineness acquisition value corresponding to the actual fineness of the fiber bundle 12 prior to the resin 14 being supplied thereto. Therefore, the resin content of the tow prepreg 16 can be controlled with high accuracy, regardless of variations in the fineness of the fiber bundle 12.

In the manufacturing apparatus 10 according to the above-described embodiment, the resin supply amount control unit 32 includes the resin supply amount setting information I which defines a relationship between the fineness and the resin supply amount to result in the target resin content, and controls the resin supply amount so as to become a target resin supply amount determined from the resin supply amount setting information I and the fineness acquisition value. Further, in the resin supplying step of the method of manufacturing according to the above-described embodiment, the resin supply amount is controlled so as to become the target resin supply amount determined from the resin supply amount setting information I which defines a relationship between the fineness and the resin supply amount to result in the target resin content, and the fineness acquisition value.

In such cases, the target resin supply amount corresponding to the fineness acquisition value is obtained from the resin supply amount setting information I, and by the resin supply amount being controlled by the resin supply unit 30 so as to become the target resin supply amount, it becomes possible to easily and highly accurately obtain the tow prepreg 16 having the target resin content.

In the manufacturing apparatus 10 according to the above-described embodiment, in the transport path of the fiber bundle 12 by the transport mechanism 20, at a stage after the fineness acquisition position where the fineness acquisition unit 26 acquires the fineness acquisition value, the resin contact position is provided where the resin 14 on the roller surface 28a and the fiber bundle 12 come into contact with each other, and when the fineness acquisition location of the fiber bundle 12 from which the fineness acquisition value is acquired at the fineness acquisition position has reached the resin contact position, the resin supply amount control unit 32 controls the resin supply amount in a manner so that the resin supply amount of the resin 14 in contact with the fineness acquisition location becomes the target resin supply amount corresponding to the fineness acquisition value at the fineness acquisition location.

Further, in the method of manufacturing according to the above-described embodiment, in the transport path of the fiber bundle 12 by the transport mechanism 20, at a stage after the fineness acquisition position where the fineness acquisition value is acquired in the fineness acquisition step, the resin contact position is provided for causing the resin 14 on the roller surface 28a and the fiber bundle 12 to come into contact with each other, and in the resin supplying step, when the fineness acquisition location of the fiber bundle 12 from which the fineness acquisition value is acquired at the fineness acquisition position has reached the resin contact position, the resin supply amount is controlled in a manner so that the resin supply amount of the resin 14 in contact with the fineness acquisition location becomes the target resin supply amount corresponding to the fineness acquisition value at the fineness acquisition location.

For example, a timing at which the fineness acquisition location reaches the resin contact position can be detected, based on the distance from the fineness measurement position of the transport path to the resin contact position, and the transport speed of the fiber bundle 12 by the transport mechanism 20. Consequently, the resin 14 having the resin supply amount which is set corresponding to the fineness acquisition value at the fineness acquisition location can be supplied with respect to the fineness acquisition location. As a result, the resin content of the tow prepreg 16 can be controlled with higher accuracy and be set to the target value, regardless of variations in the fineness of the fiber bundle 12.

In the manufacturing apparatus 10 according to the above-described embodiment, the fineness acquisition unit 26 acquires the fineness acquisition value at a predetermined cycle. In the method of manufacturing according to the above-described embodiment, in the fineness acquisition step, the fineness acquisition value is acquired at a predetermined cycle. In such cases, the resin content can be controlled and set at the target value with high accuracy, over the entire lengthwise direction of the tow prepreg 16 that is transported by the transport mechanism 20.

In the manufacturing apparatus 10 according to the above-described embodiment, the fineness acquisition unit 26 includes the fiber bundle basis weight measurement unit 54 that measures the mass per unit area of the fiber bundle 12 and thereby obtains the fiber bundle basis weight measurement value, and the fiber bundle width measurement unit 56 that measures the width of the fiber bundle 12 and thereby obtains the fiber bundle width measurement value, and acquires the fineness acquisition value based on the fiber bundle basis weight measurement value and the fiber bundle width measurement value. Further, in the method of manufacturing according to the above-described embodiment, in the fineness acquisition step, the fineness acquisition value is acquired based on the fiber bundle basis weight measurement value obtained by measuring the mass per unit area of the fiber bundle 12, and the fiber bundle width measurement value obtained by measuring the width of the fiber bundle 12. In such cases, the fineness acquisition value can be acquired with high accuracy with a simple configuration.

In the manufacturing apparatus 10 according to the above-described embodiment, there is further provided the blade 34 that serves to level the thickness of the resin 14 on the roller surface 28a prior to being brought into contact with the fiber bundle 12, and the blade adjustment unit 36 that adjusts the distance between the blade 34 and the roller surface 28a in accordance with the resin supply amount. Further, in the method of manufacturing according to the above-described embodiment, the blade 34 that levels the thickness of the resin 14 on the roller surface 28a prior to being brought into contact with the fiber bundle 12 is disposed in facing relation to the roller surface 28a, and in the resin supplying step, the distance between the blade 34 and the roller surface 28a is adjusted in accordance with the resin supply amount. In such cases, since the resin 14 after having been leveled by the blade 34 can be brought into contact with the fiber bundle 12, the resin 14 can be efficiently and satisfactorily contained over the entire widthwise direction of the fiber bundle 12.

In the manufacturing apparatus 10 according to the above-described embodiment, there are further provided the tow prepreg acquisition unit 38 that acquires the tow prepreg acquisition value, which is defined by the mass per unit length of the tow prepreg 16 during conveyance thereof by the transport mechanism 20, and the resin content acquisition unit 40 that acquires the resin content acquisition value of the tow prepreg 16, based on the fineness acquisition value and the tow prepreg acquisition value. Further, in the method of manufacturing according to the present invention, there is further provided the resin content acquisition step of acquiring, after the impregnation step, the tow prepreg acquisition value, which is defined by the mass per unit length of the tow prepreg 16 during conveyance thereof, and acquiring the resin content acquisition value of the tow prepreg 16, based on the tow prepreg acquisition value, and the fineness acquisition value acquired in the fineness acquisition step. In such cases, the resin content of the manufactured tow prepreg 16 can be acquired with high accuracy regardless of variations in the fineness thereof. Hence, quality control of the tow prepreg 16 can be suitably carried out.

In the manufacturing apparatus 10 according to the above-described embodiment, the tow prepreg acquisition unit 38 includes the tow prepreg basis weight measurement unit 60 that measures the mass per unit area of the tow prepreg 16 and thereby obtains the tow prepreg basis weight measurement value, and the tow prepreg width measurement unit 62 that measures the width of the tow prepreg 16 and thereby obtains the tow prepreg width measurement value, and acquires the tow prepreg acquisition value based on the tow prepreg basis weight measurement value and the tow prepreg width measurement value. Further, in the above-described method of manufacturing according to the above-described embodiment, in the resin content acquisition step, the tow prepreg acquisition value is acquired based on the tow prepreg basis weight measurement value obtained by measuring the mass per unit area of the tow prepreg 16, and the tow prepreg width measurement value obtained by measuring the width of the tow prepreg 16. In such cases, the resin content of the tow prepreg 16 can be obtained with high accuracy with a simple configuration.

The present invention is not limited to the embodiments described above, and various modifications can be made thereto without departing from the essence and gist of the present invention as set forth in the appended claims.

What is claimed is:

1. A tow prepreg manufacturing apparatus configured to manufacture a tow prepreg by impregnating with a resin a fiber bundle in which a plurality of fibers are bundled together, comprising:
   an impregnated roller capable of rotating at a constant speed;
   a resin supply unit configured to supply the resin to a roller surface of the impregnated roller;
   a transport mechanism configured to bring the fiber bundle into contact with the resin on the roller surface and thereby form the tow prepreg while the fiber bundle is being transported;
   a fineness acquisition unit arranged upstream of the impregnated roller and configured to acquire as a fineness acquisition value a fineness, which is defined by a mass per unit length of the fiber bundle prior to impregnation with the resin during conveyance thereof by the transport mechanism;

a blade disposed between the resin supply unit and a position at which the fiber bundle is brought into contact with the resin on the roller surface; and one or more processors, wherein the one or more processors cause the tow prepreg manufacturing apparatus to control a resin supply amount of the resin supplied to the roller surface by the resin supply unit, wherein the one or more processors control the resin supply amount of the resin supplied from the resin supply unit to the roller surface based on the fineness acquisition value of the fiber bundle prior to the impregnation with the resin, in a manner so that a resin content of the tow prepreg becomes a target resin content, wherein the blade faces the roller surface and is configured to level a thickness of the resin on the roller surface before the fiber bundle is brought into contact with the resin on the roller surface, and wherein the one or more processors adjust a distance between the blade and the roller surface in accordance with the resin supply amount.

2. The tow prepreg manufacturing apparatus according to claim 1, wherein the one or more processors include resin supply amount setting information which defines a relationship between the fineness and the resin supply amount to result in the target resin content, and control the resin supply amount so as to become a target resin supply amount determined from the resin supply amount setting information and the fineness acquisition value.

3. The tow prepreg manufacturing apparatus according to claim 2, wherein:

in a transport path of the fiber bundle by the transport mechanism, at a stage after a fineness acquisition position where the fineness acquisition unit acquires the fineness acquisition value, a resin contact position is provided where the resin on the roller surface facing the blade and the fiber bundle come into contact with each other; and when a fineness acquisition location of the fiber bundle from which the fineness acquisition value is acquired at the fineness acquisition position has reached the resin contact position, the one or more processors control the resin supply amount in a manner so that the resin supply amount of the resin in contact with the fineness acquisition location becomes the target resin supply amount corresponding to the fineness acquisition value at the fineness acquisition location.

4. The tow prepreg manufacturing apparatus according to claim 1, wherein the fineness acquisition unit acquires the fineness acquisition value at a predetermined cycle.

5. The tow prepreg manufacturing apparatus according to claim 1, wherein the fineness acquisition unit includes a fiber bundle basis weight measurement unit measuring a mass per unit area of the fiber bundle and thereby obtaining a fiber bundle basis weight measurement value, and a fiber bundle width measurement unit measuring a width of the fiber bundle and thereby obtaining a fiber bundle width measurement value, and acquire the fineness acquisition value based on the fiber bundle basis weight measurement value and the fiber bundle width measurement value.

6. The tow prepreg manufacturing apparatus according to claim 1, further comprising:

a tow prepreg acquisition unit configured to acquire a tow prepreg acquisition value, which is defined by a mass per unit length of the tow prepreg during conveyance thereof by the transport mechanism; and a resin content acquisition unit configured to acquire a resin content acquisition value of the tow prepreg, based on the fineness acquisition value and the tow prepreg acquisition value.

7. The tow prepreg manufacturing apparatus according to claim 6, wherein the tow prepreg acquisition unit includes a tow prepreg basis weight measurement unit measuring a mass per unit area of the tow prepreg and thereby obtaining a tow prepreg basis weight measurement value, and a tow prepreg width measurement unit measuring a width of the tow prepreg and thereby obtaining a tow prepreg width measurement value, and the tow prepreg acquisition unit is configured to acquire the tow prepreg acquisition value based on the tow prepreg basis weight measurement value and the tow prepreg width measurement value.

* * * * *